(12) United States Patent
Choi et al.

(10) Patent No.: US 8,336,422 B2
(45) Date of Patent: Dec. 25, 2012

(54) DAMPING SYSTEM FOR SHIFT CABLE

(75) Inventors: Jeehyuck Choi, Hwaseong-si (KR); Yangrae Cho, Hwaseong-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 481 days.

(21) Appl. No.: 12/549,935

(22) Filed: Aug. 28, 2009

(65) Prior Publication Data

US 2010/0139443 A1    Jun. 10, 2010

(30) Foreign Application Priority Data

Dec. 5, 2008   (KR) .................. 10-2008-0123072

(51) Int. Cl.
*F16C 1/22* (2006.01)
(52) U.S. Cl. ............................................ 74/502.6
(58) Field of Classification Search ............. 74/502.4, 74/502.5, 502.6
See application file for complete search history.

(56) References Cited

U.S. PATENT DOCUMENTS

| | | | | |
|---|---|---|---|---|
| 4,546,665 A | * | 10/1985 | Bieber | 74/473.33 |
| 4,991,700 A | * | 2/1991 | Koga | 192/220.3 |
| 5,027,673 A | * | 7/1991 | Behrens et al. | 74/473.1 |
| 6,349,613 B1 | * | 2/2002 | Tsuge et al. | 74/501.5 R |

FOREIGN PATENT DOCUMENTS

| | | | |
|---|---|---|---|
| DE | 4436958 A1 | * | 4/1996 |
| JP | 57080958 A | * | 5/1982 |
| JP | 2-261916 A | | 10/1990 |
| JP | 2004-108472 A | | 4/2004 |
| KR | 2003-0090813 A | | 12/2003 |
| KR | 10-2005-0034278 A | | 4/2005 |
| KR | 10-2005-0036055 A | | 4/2005 |
| KR | 10-0528037 B1 | | 11/2005 |
| KR | 10-2006-0016031 A | | 2/2006 |

* cited by examiner

*Primary Examiner* — Vicky Johnson
(74) *Attorney, Agent, or Firm* — Morgan, Lewis & Bockius LLP

(57) ABSTRACT

A damping system for a shift cable is disclosed, in which vibrations and noises that are generated by a transmission and transmitted into the interior of a vehicle through a shift cable are considerably reduced across a damper, that is positioned in a bottleneck section of a socket housing and contacts with bottleneck section, such that it is possible to effectively exclude vibrations and noises transmitted into the interior of a vehicle. Further, the present invention is advantageous in terms of the cost and weight, because a rubber damper is used instead of a mass damper, and it is possible to reduce vibrations and noises without increasing force for operating a shift lever and maximally prevent the function of reducing vibrations and noises from being deteriorated by frictional wear.

6 Claims, 10 Drawing Sheets

DAMPING SYSTEM FOR SHIFT CABLE

CROSS-REFERENCE TO RELATED APPLICATIONS

The present application claims priority to Korean Patent Application Number 10-2008-0123072 filed Dec. 5, 2008, the entire contents of which application is incorporated herein for all purposes by this reference.

BACKGROUND OF THE INVENTION

1. Field of the Invention

The present invention relates to a damping system that is equipped on a shift cable to prevent vibrations and noises created by a transmission from being transmitted into the interior of a vehicle through the shift cable.

2. Description of Related Art

In general, since the driving force of vehicles considerably changes in accordance with the amount of loads on the vehicle, conditions of roads, and the traveling velocity, etc., vehicles are equipped with a transmission for converting the power of the engine into appropriate driving force.

The transmission can be largely classified into an automatic transmission and a manual transmission, and as shown in FIG. 1, a transmission 1 positioned in the engine compartment and a shift lever 2 positioned in the interior of a vehicle are connected by a shift cable 3.

Shift cable 3 is formed by coating a cover 3b around an internal steel core 3a.

Further, shift cable 3 is equipped with a mass damper 4 for preventing vibrations and noises, which are created by transmission 1, from being transmitted to shift lever 2 through shift cable 3.

However, mass damper 4 of the related art is disadvantageous in terms of the cost and weight.

Further, since mass damper 4 is substantially attached to cover 3b coated around shift cable 3, it can reduce only the vibration and noise transmitted through cover 3b, but is insufficient to reduce the vibration and noise transmitted through steel core 3a.

Further, cover 3b of shift cable 3 and mass damper 4 are damaged by friction when repeatedly used, such that as time progresses, the effect of reducing vibrations and noises decreases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a damping system for a shift cable that is advantageous in terms of the cost and weight because of not using a mass damper, has substantially large effect of reducing vibrations and noises by reducing the vibration and noises transmitted through a steel core of the shift cable, and maximally prevent the function of reducing vibrations and noises from being deteriorated by frictional wear, even if it is repeatedly used for a long period of time.

In an aspect of the present invention, the damping system for a shift cable, may include at least a socket housing that is fixed not to be moved with the shift cable passing through both ends thereof when a shift lever is operated, and has a bottleneck section of which an inner diameter gradually decreases, and a damper that is integrally combined with the shift cable passing through the damper, disposed in the socket housing, and moved with the shift cable and selectively positioned in the bottleneck section of the socket housing when the shift lever is operated.

The bottleneck section is a section that connects a section having a large inner diameter with a section having a small inner diameter in the socket housing and of which the inner diameter gradually decreases toward a shift lever housing.

The socket housing may be arranged such that the section having the large inner diameter receives the damper therein and faces a transmission housing, wherein one of the at least a socket housing is fixed to the transmission housing and another of the at least a socket housing is fixed to the shift lever housing.

The shift lever is a shift lever for an automatic transmission having a common traveling mode range including a P-stage, an R-stage, an N-stage, and a D-stage and a sports mode range including a + stage and a − stage, and the damper is inserted into the bottleneck section and positioned in the bottleneck section, when the shift lever is positioned at the D-stage.

The damper may be made of rubber.

The damper may be a truncated cone having an equilateral trapezoid cross section, wherein the damper is arranged such that an end having a relatively large diameter faces the transmission housing, wherein a plurality of damper projections integrally protrudes on the outer circumference of the damper, and wherein a plurality of grease grooves is formed on the outer circumference of the damper.

In another aspect of the present invention, the damping system for a shift cable, may include at least a socket housing that is fixed not to be moved with the shift cable passing through both ends thereof when a shift lever is operated, and have a bottleneck section of which an inner diameter gradually decreases, a damper that is disposed in the socket housing to be moved slidably along the shift cable passing through both ends of the damper and selectively positioned in the bottleneck section of the socket housing while moving along the shift cable, a damper plate that is disposed in the socket housing and integrally combined with the shift cable at a predetermined distance from the damper, and an elastic member disposed between the damper plate and the damper and connecting the damper with the damper plate.

The shift lever is a shift lever for an automatic transmission having a common traveling mode range including a P-stage, an R-stage, an N-stage, a D-stage, a third stage, a second stage, and an L-stage, and the damper is inserted into the bottleneck section and positioned in the bottleneck section, when the shift lever is positioned at the D-stage, the third stage, the second stage, or the L-stage.

According to various aspects of the present invention, vibrations and noises that are generated by a transmission and transmitted into the interior of a vehicle through a shift cable are considerably reduced across a damper that is positioned in a bottleneck section of a socket housing and contacts with the bottleneck section, such that it is possible to effectively exclude vibrations and noises transmitted into the interior of a vehicle. Further, the present invention is advantageous in terms of the cost and weight, because a rubber damper is used instead of a mass damper, and it is possible to reduce vibrations and noises without increasing force for operating a shift lever and maximally prevent the function of reducing vibrations and noises from being deteriorated by frictional wear.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
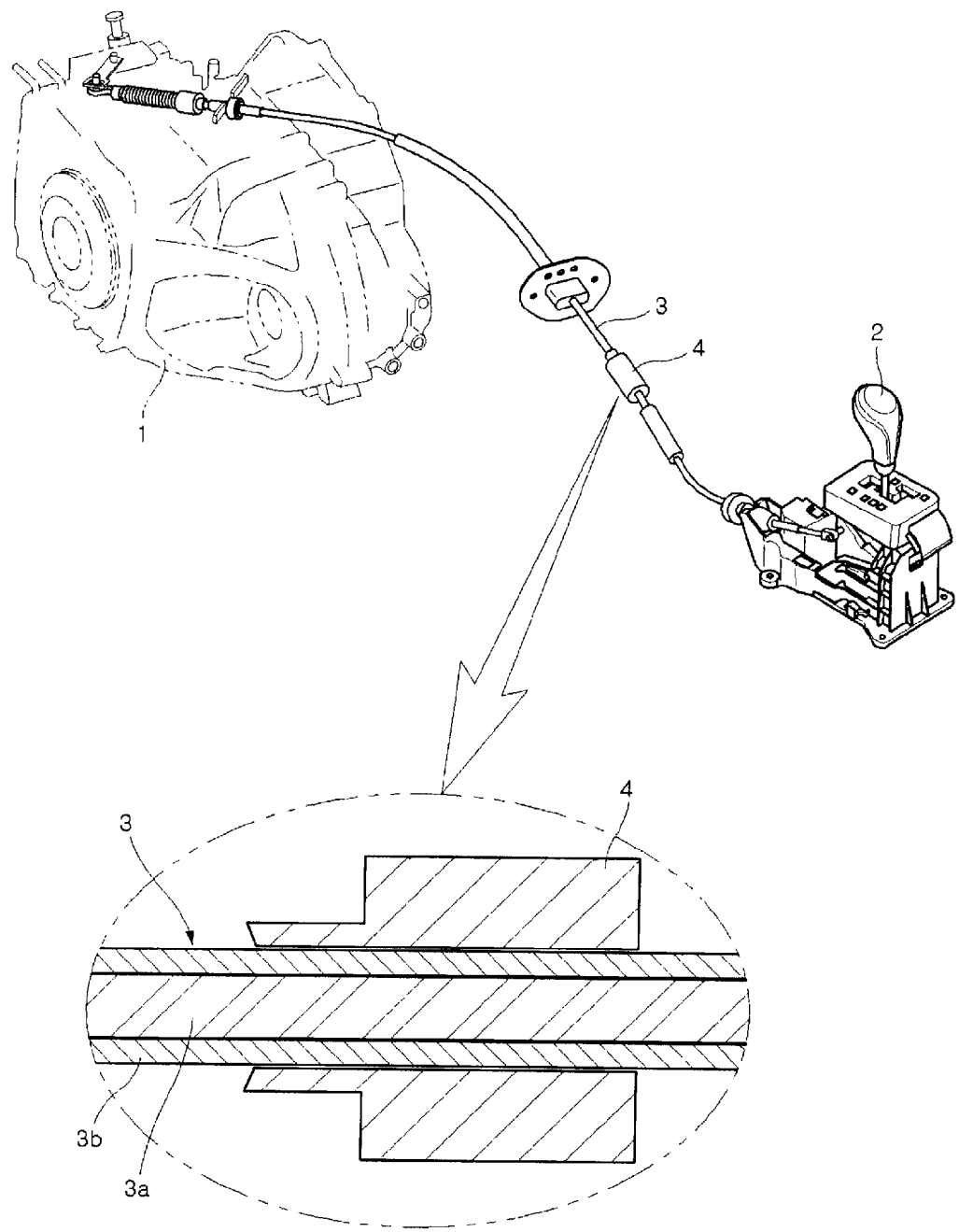
FIG. 1 is a view illustrating a configuration of the related art using a mass damper to reduce vibrations and noises of a shift cable.
Figure 2:
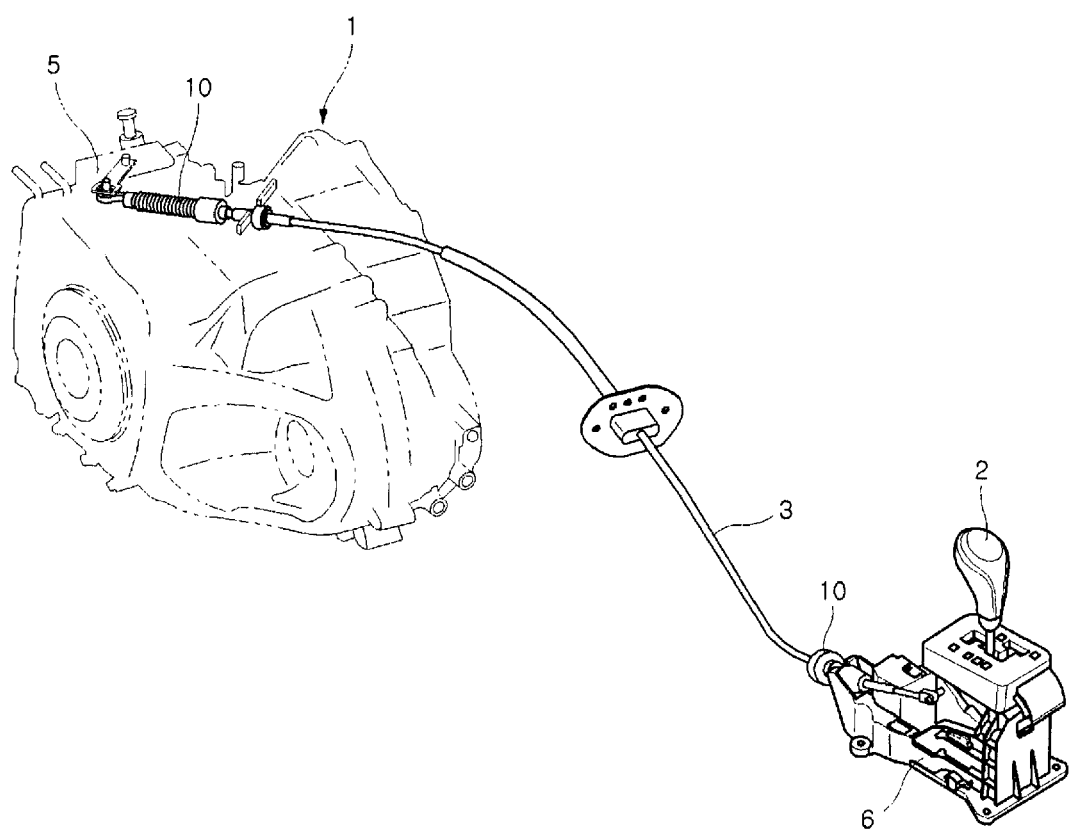
FIGS. 2 to 6 are views illustrating a damping system for a shift cable according to an exemplary embodiment of the present invention.
Figure 3:
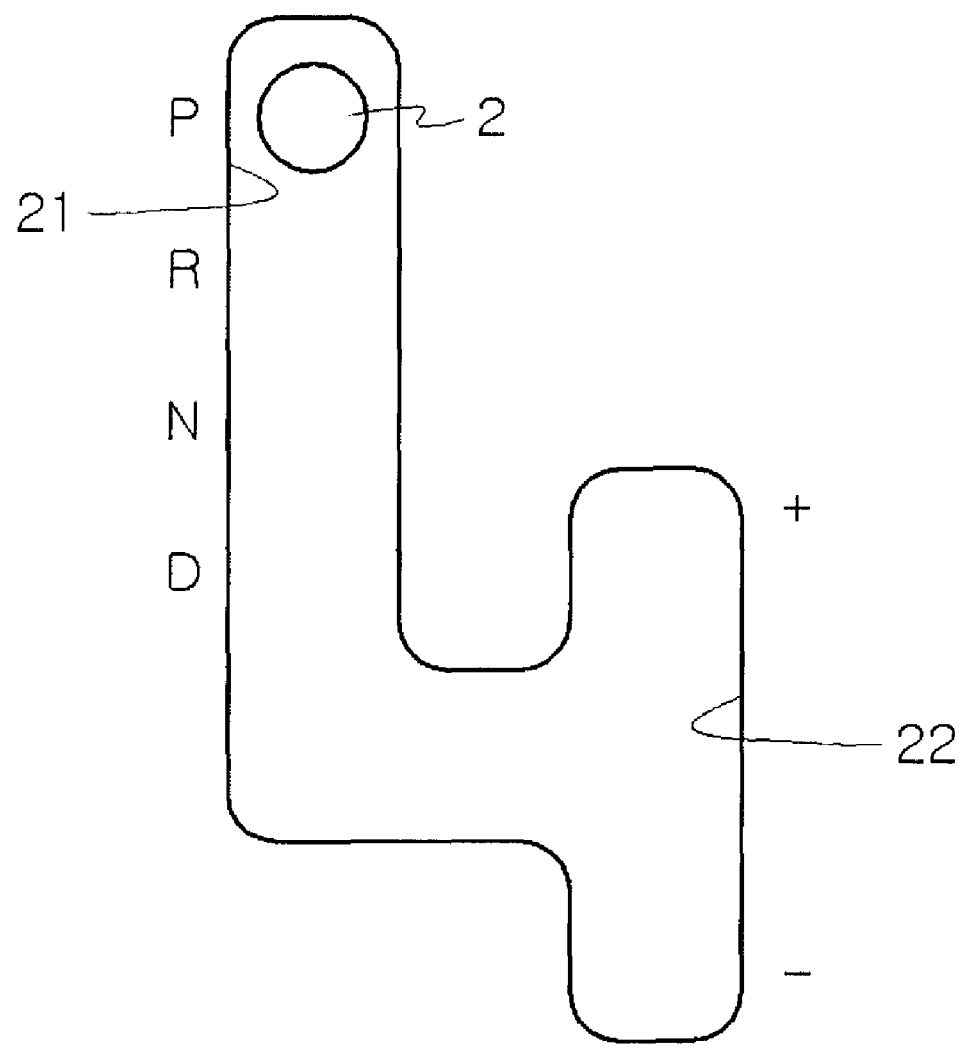

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment according to the present invention, as shown in FIGS. 2 to 6, is configured such that an automatic transmission 1 positioned in the engine compartment and a shift lever 2 positioned in the interior of a vehicle are connected by a shift cable 3, a socket housing 10 is fixed to a transmission housing 5 and a shift lever housing 6, and shift cable 3 passes through both ends of socket housings 10.

Shift lever 2 is a shift lever for an automatic transmission which can be moved along a normal traveling mode range 21 including a P-stage (Parking), an R-stage (Reverse), an N-stage (Neutral), and a D-stage (Driving), and a sports mode range 22 including a + stage and a − stage, by operation of a driver.

Socket housing 10 has a section 11 having a large inner diameter, a section 12 having a small inner diameter, and a bottleneck section 13 connecting sections 11, 12.

Bottleneck section 13 gradually decreases in inner diameter from section 11 having a large inner diameter to section 12 having a small inner diameter.

Socket housing 10 is arranged such that section having a relatively large inner diameter faces transmission housing 5 and section 12 having a relatively small inner diameter at the opposite side faces shift lever housing 6.

A rubber damper 30 is disposed in socket housing 10.

Damper 30 is integrally combined with shift cable 3 passing through both ends of damper 30, and moves with shift cable 3 and contacts with bottleneck section 13 of socket housing 10, when shift lever 2 is operated.

That is, damper 30 moves along section 11 having a large inner diameter in socket housing 10 when shift lever 2 is moved to the P-stage, R-stage, and N-stage, and is positioned in contact with bottleneck section 13 of socket housing 10 when shift lever 2 is positioned at the D-stage.

Damper 30 is formed in a cylinder shape having an equilateral trapezoid cross section and arranged such that the end having a relatively large diameter in both ends faces transmission housing 5 and the other end having a relatively small diameter at the opposite side faces shift lever housing 6.

Meanwhile, a plurality of damper projections 31 is integrally formed on the outer circumference of damper 30 and, if needed, a plurality of concave grease grooves 32 may be formed.

Damper projections 31 are formed to maximize the effect of reducing vibrations by increasing the contact force to bottleneck section 13 of socket housing 10, when damper 30 is positioned in bottleneck section 13, and grease grooves 32 are formed to maximize the effect of reducing noises by lubrication of grease 33 filled in grease grooves 32, when damper 30 contacts with bottleneck section 13 of socket housing 10.

The operation of an exemplary embodiment of the present invention is described hereafter.

Figure 4:
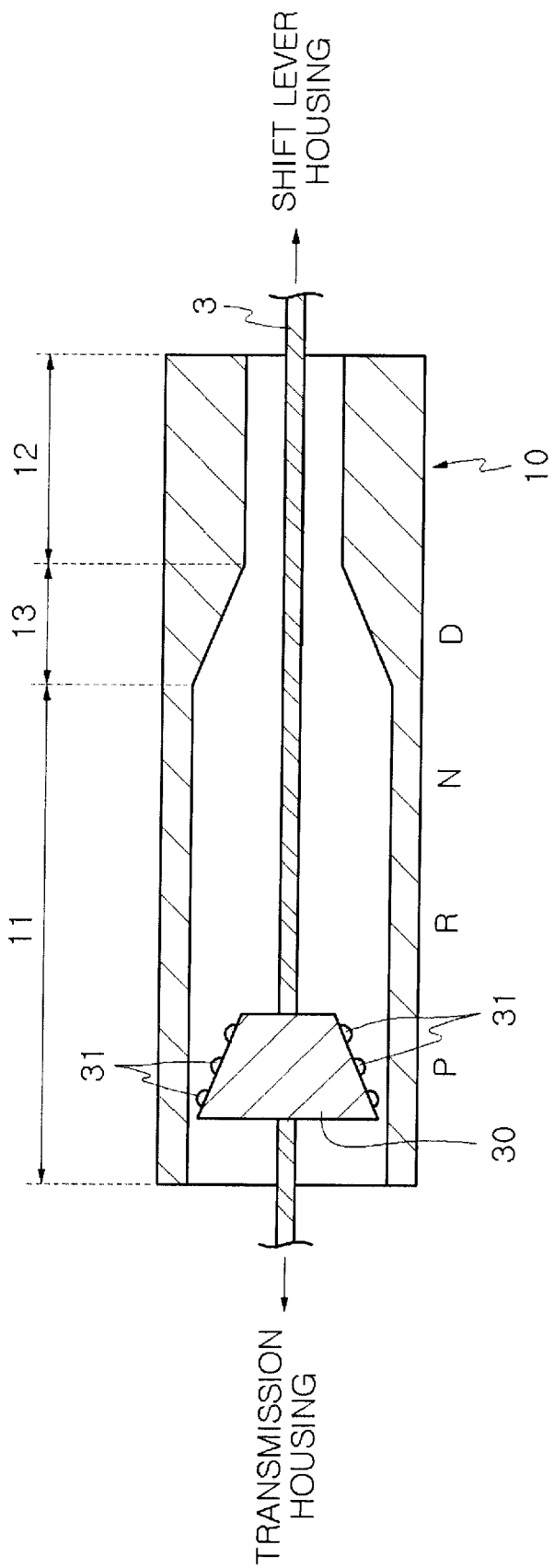
Figure 5:
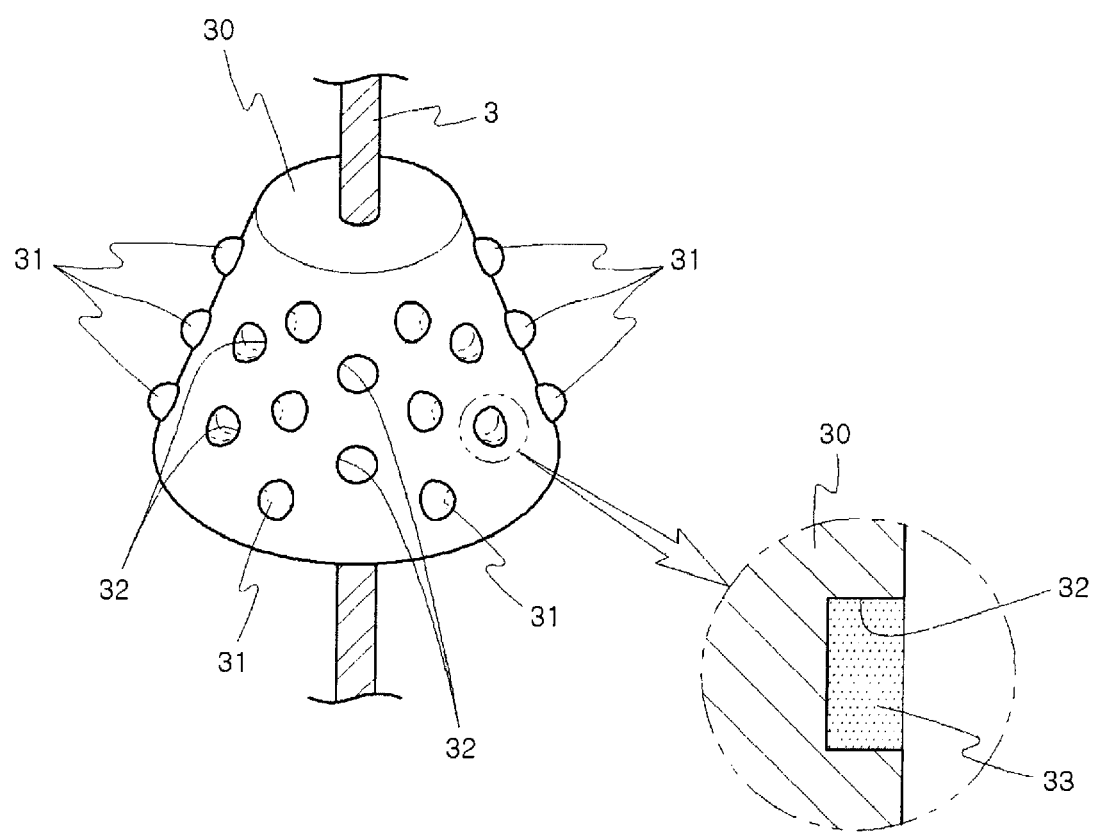

When shift lever 2 is positioned at the P-stage, damper 30, as shown in FIG. 4, is moved and positioned to shift housing 5 in section 11 having a large inner diameter of socket housing 10.

In this position, as shift lever 2 is moved from the R-stage to the N-stage by operation of a driver, damper 30 integrally combined with shift cable 3 is moved with shift cable 3 toward bottleneck section 13 through section 11 having a large inner diameter of socket housing 10.

Figure 6:
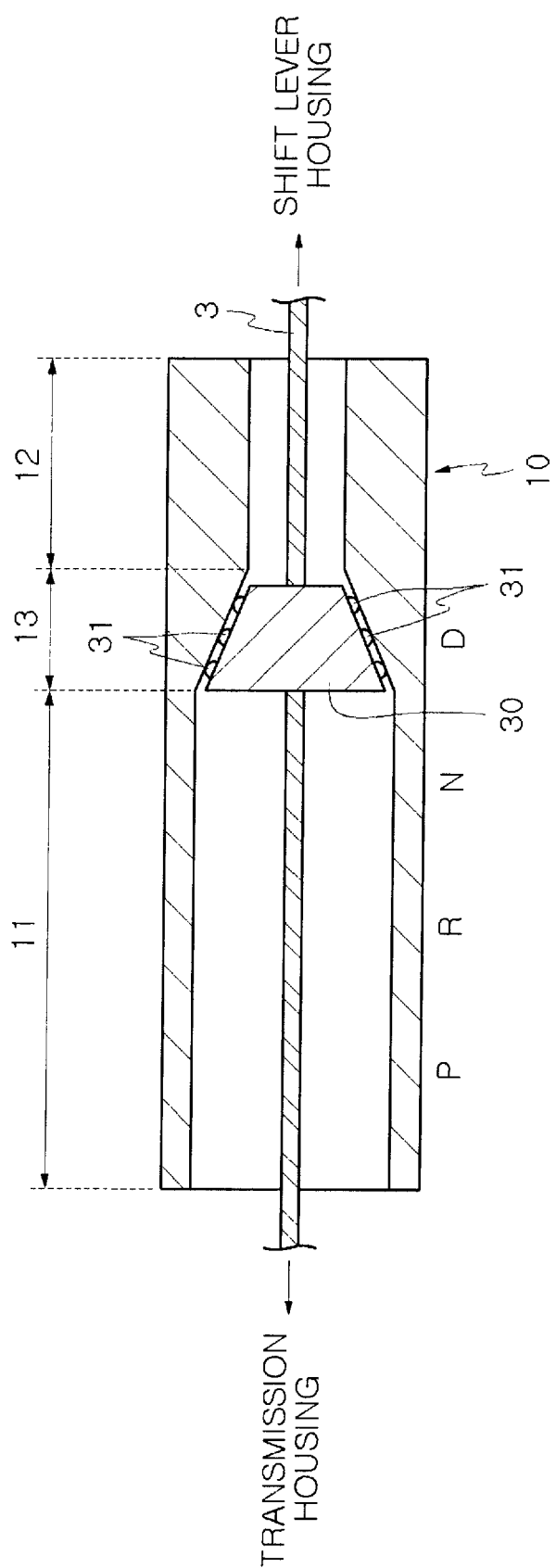
Figure 7:
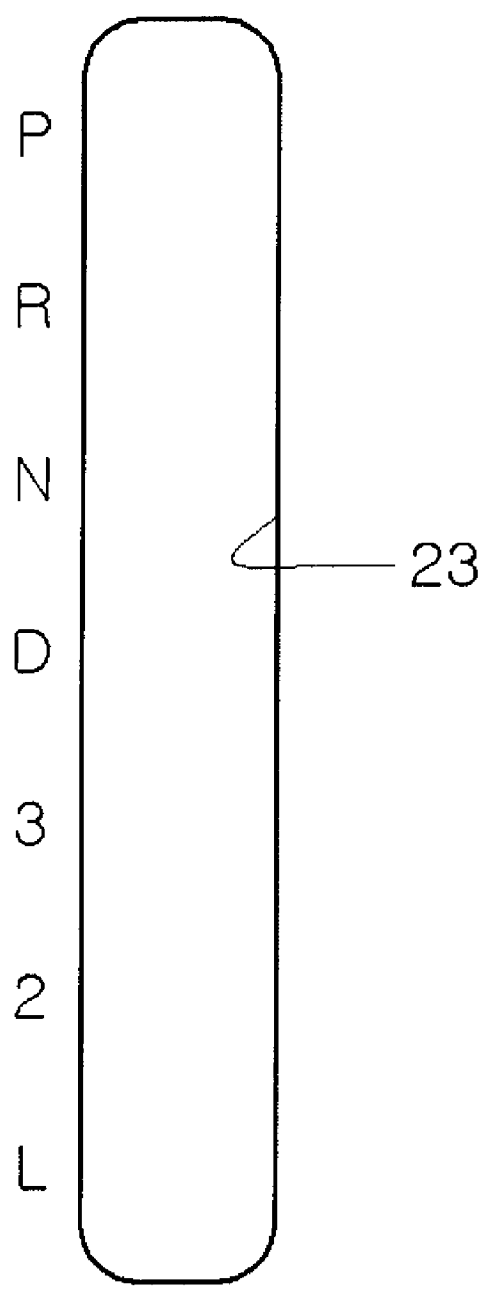
FIGS. 7 to 10 are views illustrating a damping system for a shift cable according to another exemplary embodiment of the present invention.

Further, when shift lever 2 is positioned at the D-stage, damper 30, as shown in FIG. 6, is inserted in bottleneck section 13 of socket housing 10 and is in contact with bottleneck section 13 with damper projections 31 therebetween.

When shift lever 2 is positioned at the D-stage and damper 30 is positioned in bottleneck section 13 of socket housing 10 and is in contact with bottleneck section 13 as described above, the vibration and noise created by transmission 1 and transmitted to the interior of a vehicle through shift cable 3 are considerably reduced across socket housing 10, and as a result, it is possible to effectively exclude the vibration and noise transmitted into the interior of a vehicle.

Further, grease 33 flows out of grease grooves 32 and lubricates the contact surface between bottleneck section 13 and damper projections 31 while damper 30 contacts to bottleneck section 13 of socket housing 10, such that it is possible to remove noise that is created when damper 30 contacts to bottleneck section 13 of socket housing 10.

On the other hand, shift cable 3 is not pulled, when shift lever 2 is moved from the D-stage to sports mode range 22, such that damper 30 is kept in contact with bottleneck section 12 of socket housing 10.

A damping system of another exemplary embodiment of the present invention is shown in FIGS. 7 to 10.

The configuration is the same as the exemplary embodiment described above with reference to FIG. 2 that an automatic transmission 1 and a shift lever 2 are connected by a shift cable 3, a socket housing 10 is fixed to a transmission housing 5 and a shift lever housing 6, and shift cable 3 passes through both ends of socket housings 10.

Shift lever 2 of another exemplary embodiment of the present invention is a shift lever for an automatic transmission which can be moved along a normal traveling mode range 23 including a P-stage (Parking), an R-stage (Reverse), an N-stage (Neutral), a D-stage (Driving), a third stage, a second stage, and an L-stage by operation of a driver.

The configuration of socket housing 10 is the same as the exemplary embodiment shown in FIG. 4 and detailed description is not provided.

A rubber damper 40 is disposed in socket housing 10.

That is, damper 40 is disposed to move along shift cable 3 passing through both ends of damper 40, such that when moving along shift cable 3, damper 40 is inserted into a bottleneck section 13 of socket housing 10 and selectively positioned in contact with bottleneck 13.

Damper 40 has the same configuration as damper 30 of the exemplary embodiment described above with reference to FIG. 5, that is, it is formed in a cylinder shape having an equilateral trapezoid cross section and arranged such that one end having a relatively large diameter in both ends faces transmission housing 5 and the other end having a relatively small diameter at the opposite side faces shift lever housing 6.

On the outer circumference of damper 40, a plurality of damper projections 41 is formed, and if needed, a plurality of concave grease grooves 42 is formed and filled with grease 43.

Damper projections 41 are formed to maximize the effect of reducing vibrations by increasing the contact force to bottleneck section 13 of socket housing 10, when damper 40 is positioned in bottleneck section 13, and grease grooves 42 are formed to maximize the effect of reducing noises by lubrication of grease 43 filled in grease grooves 42, when damper 40 contacts with bottleneck section 13 of socket housing 10.

Further, a damper plate 50 is integrally combined with shift cable 3 at a predetermined distance toward transmission housing 5 from damper 40.

Further, a compression spring 60 is disposed between damper 40 and damper plate 50 and one end of compression spring 60 is connected to damper 40 and the other end is connected to damper plate 50.

In an exemplary embodiment of the present invention, the damper 40 may be slidably coupled to the shift cable 3. For instance, the shift cable 3 may slidably pass through the damper 40.

Therefore, when shift lever 2 is positioned at the D-stage, damper 40 is inserted in bottleneck section 13 of socket housing 10 and positioned in contact with bottleneck section 13.

The operation of another embodiment of the present invention is described hereafter.

Figure 8:
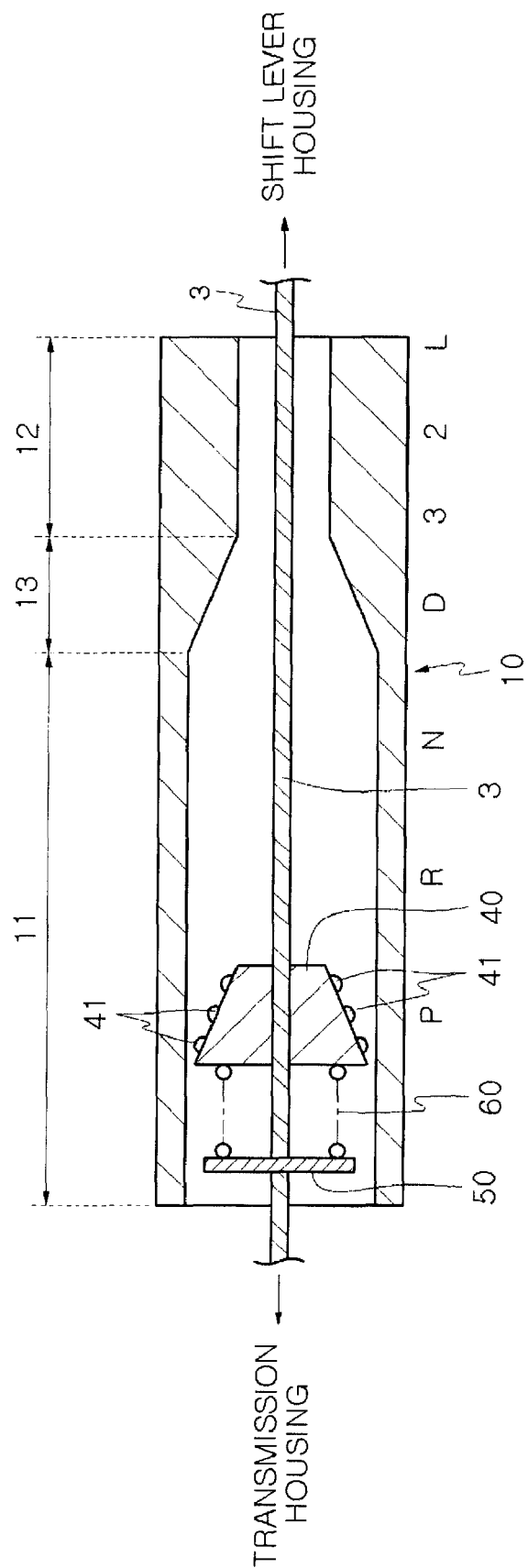
Figure 9:
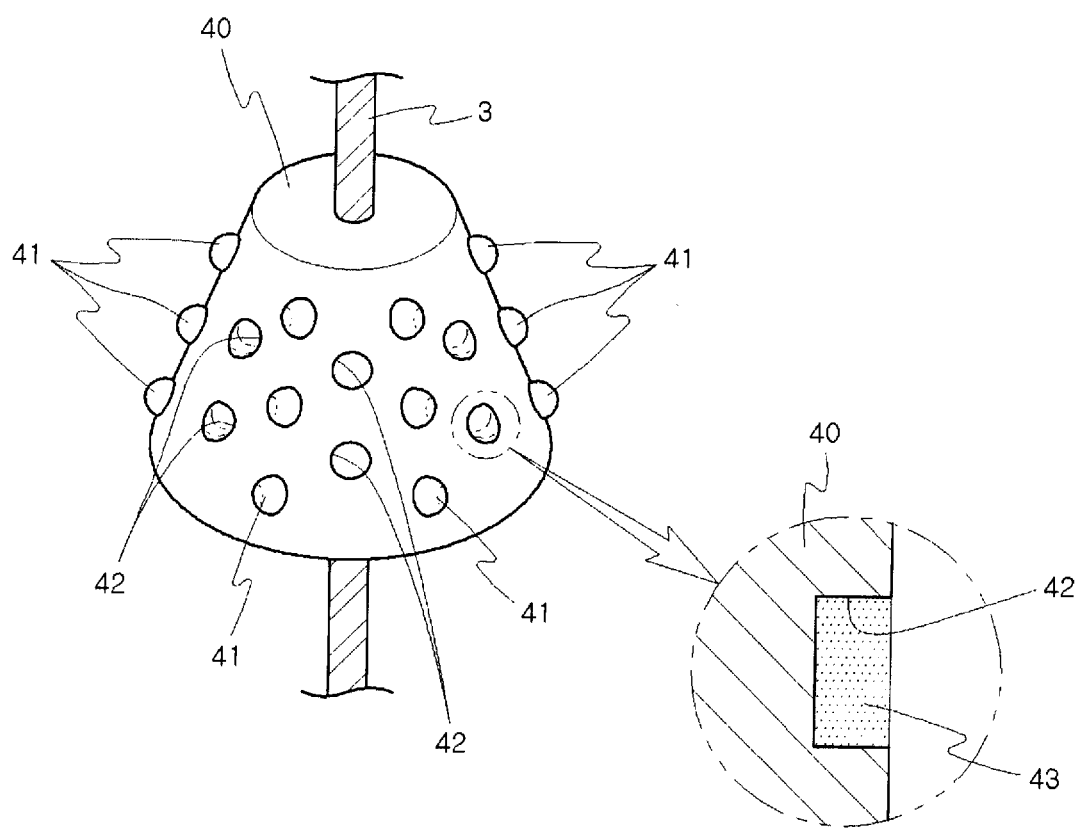

When shift lever 2 is positioned at the P-stage, damper 40, as shown in FIG. 8, is moved and positioned to shift housing 5 in section 11 having a large inner diameter of socket housing 10.

In this position, as shift lever 2 is moved from the R-stage to the N-stage by operation of a driver, damper plate 50 integrally combined with shift cable 3 and damper 40 connected with damper plate 50 by compression spring 60 are moved with shift cable 3 toward bottleneck section 13 through section 11 having a large inner diameter of socket housing 10.

Figure 10:
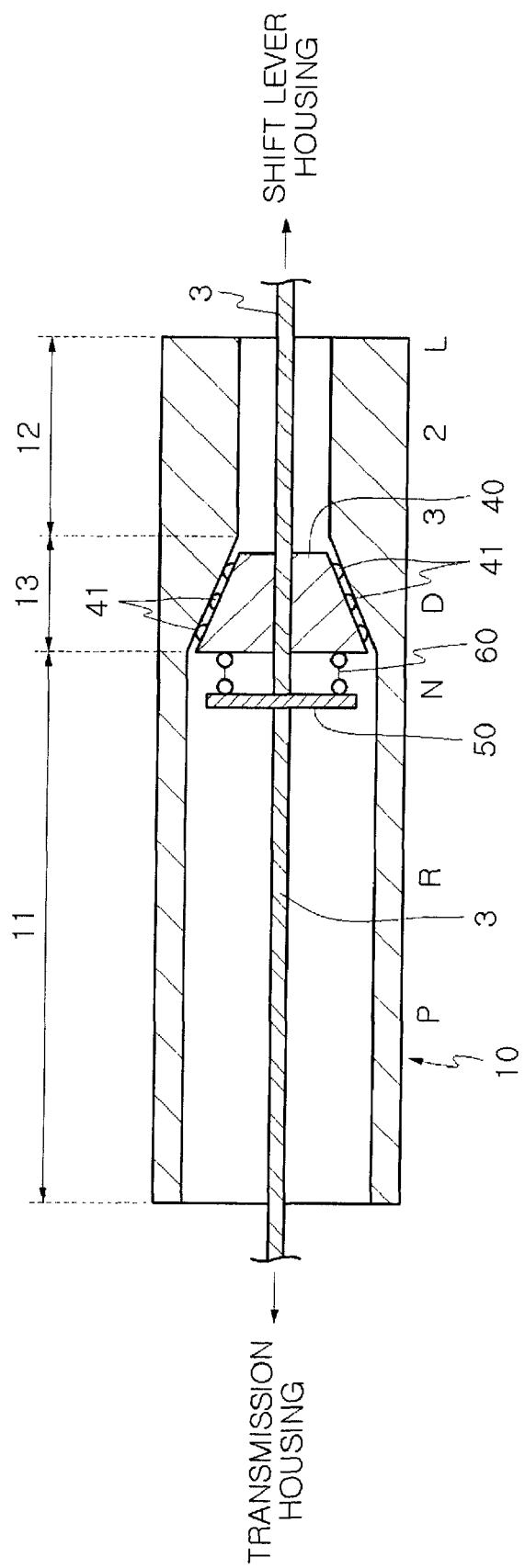

Further, when shift lever 2 is positioned at the D-stage, damper 40, as shown in FIG. 10, is inserted in bottleneck section 13 of socket housing 10 and is in contact with bottleneck section 13 with damper projections 41 therebetween.

When shift lever 2 is positioned at the D-stage and damper 40 is in contact with bottleneck section 13 of socket housing 10 as described above, the vibration and noise created by transmission 1 and transmitted to the interior of a vehicle through shift cable 3 are considerably reduced across socket housing 10, and as a result, it is possible to effectively exclude the vibration and noise transmitted into the interior of a vehicle.

Further, grease 43 flows out of grease grooves 42 and lubricates the contact surface between bottleneck section 13 and damper projections 41 while damper 40 contacts to bottleneck section 13 of socket housing 10, such that it is possible to remove noise that is created when damper 40 contacts to bottleneck section 13 of socket housing 10.

When shift lever 2 is moved from the D-stage to the third stage, second stage, and L-stage, damper 40 is no longer moved toward shift lever housing 6 by bottleneck section 13 of socket housing 10, but shift cable 3 keeps moving.

That is, since shift cable 3 passes through damper 40 and damper 40 can move along shift cable 3, shift cable 3 can keep moving, although damper 40 cannot be moved toward shift lever housing 6, when shift lever 2 is moved from the D-stage to the third stage, second stage, and L-stage.

As shift lever 2 is moved from the D-stage to the third stage, second stage, and L-stage and shift cable 3 correspondingly keeps moving as described above, compression spring 60 starts to deform as shown in FIG. 10 an damper 40 is compressed by larger force in bottleneck 13 of socket housing 10, such that the effect of reducing the vibration and noise across damper 40 is further improved.

In the exemplary embodiments of the present invention, as described above, since a rubber damper is used instead of a mass damper, this configuration is advantageous in terms of the cost and weight and can reduce vibrations and noises without increasing force for operating shift lever 2. Further, it is possible to maximally prevent the function of reducing vibrations and noises from being deteriorated by frictional wear.

For convenience in explanation and accurate definition in the appended claims, the terms "interior", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damping system comprising:
   a shift cable;
   at least a socket housing that is fixed not to be moved with the shift cable passing through both ends thereof when a shift lever is operated, and has a bottleneck section of which an inner diameter gradually decreases; and
   a damper that is integrally combined with the shift cable passing through the damper, disposed in the socket housing, and moved with the shift cable and selectively positioned in the bottleneck section of the socket housing when the shift lever is operated,
   wherein the shift lever is a shift lever for an automatic transmission having a common traveling mode range including a P-stage, an R-stage, an N-stage, and a D-stage and a sports mode range including a +stage and a −stage, wherein the damper is inserted into the bottleneck section and positioned in the bottleneck section, when the shift lever is positioned at the D-stage, wherein the damper is made of rubber, wherein the damper is a truncated cone having an equilateral trapezoid cross section, and wherein a plurality of damper projections integrally protrudes on an outer circumference of the damper.

2. The damping system as defined in claim 1, wherein the bottleneck section is a section that connects a section having a large inner diameter with a section having a small inner diameter in the socket housing and of which the inner diameter gradually decreases toward a shift lever housing.

3. The damping system as defined in claim 2, wherein the socket housing is arranged such that the section having the large inner diameter receives the damper therein and faces a transmission housing.

4. The damping system as defined in claim 3, wherein one of the at least a socket housing is fixed to the transmission housing and another of the at least a socket housing is fixed to the shift lever housing.

5. The damping system as defined in claim 1, wherein the damper is arranged such that an end having a relatively large diameter faces the transmission housing.

6. The damping system as defined in claim 1, wherein a plurality of grease grooves is formed on the outer circumference of the damper.

* * * * *